May 15, 1962 — H. D. HAMPTON — 3,034,350

SUBSURFACE FLUID METER

Filed Feb. 6, 1959

INVENTOR
Harry D. Hampton

BY Cecil L. Wood

ATTORNEY

United States Patent Office 3,034,350
Patented May 15, 1962

3,034,350
SUBSURFACE FLUID METER
Harry Donald Hampton, Wichita Falls, Tex.
(205 Clark Circle, Henrietta, Tex.)
Filed Feb. 6, 1959, Ser. No. 791,732
2 Claims. (Cl. 73—155)

This invention relates to a subsurface fluid meter, and it concerns more particularly an instrument for detecting leaks in oil well casing.

An object of the invention is to provide a tool adapted to be lowered in a well casing, on a wire line, to a desired elevation and having means for collecting and weighing at the surface, by means of the wire line, a sample of any well fluids which may be found at such elevation.

Another object of the invention is to provide a tool for the purpose described which includes a tubular receptacle, open at its ends, adapted to be lowered in the casing and having a support therefor frictionally and yieldably engaging the inner wall of the casing, an elongated rod arranged concentrically within the receptacle and adapted to be suspended from a wire line, the rod being movable reciprocally relative to the receptacle and having a first enlargement on its lower end for abutment against the lower end of the receptacle, whereby the receptacle is supported on the rod, and a second enlargement on its upper end for abutment against the upper end of the receptacle to urge the receptacle downwardly relative to the casing, and a valve disc on the rod above the first enlargement for sliding engagement with the inner wall of the receptacle adjacent its lower end, to provide a closure therefor, when the rod is in an elevated position below its uppermost position relative to the receptacle.

Another object of the invention is to provide a tool as described which is capable of being raised and lowered in a well casing on a wire line, and in which well fluids may be admitted to the receptacle and discharged therefrom by manipulating the wire line whereby the rod is lowered relative to the receptacle to thereby disengage the valve disc from the lower end of the receptacle.

Another object of the invention is to provide a tool as described in which the valve disc slidably engages the inner wall of the receptacle, in the manner of a piston, whereby the rod is capable of supporting a column of fluid within the receptacle, independently of the receptacle, when the rod is in an elevated position below its uppermost position relative to the receptacle.

Another object of the invention is to provide a tool as described in which the weight of a column of fluid within the receptacle may be determined by first weighing the rod and its attachments, independently of the receptacle, in the open position of the valve disc, and thereafter weighing the rod and its attachments, together with the column of fluid, in the closed position of the valve disc.

Another object of the invention is to provide a tool as described which is of simple, sturdy construction and of light weight, may be manufactured inexpensively, and is efficient in operation and durable in use.

The invention will be readily understood by referring to the following description and the accompanying drawing, in which.

Figure 1:
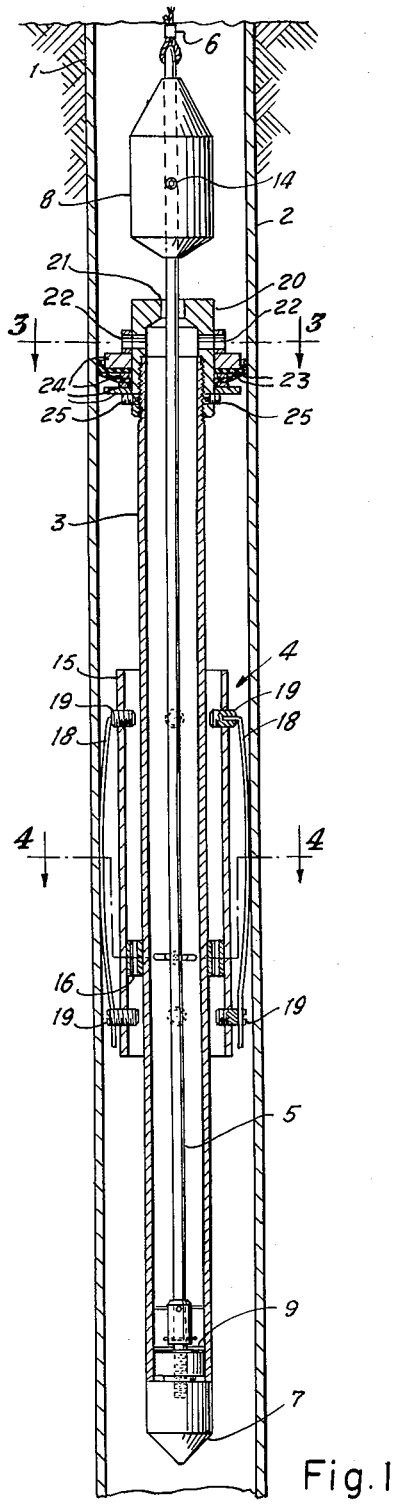
FIG. 1 is a sectional elevational view, taken on a median line, showing a tool embodying the invention operatively positioned in a well casing, with the valve disc in its closed position.
Figure 2:
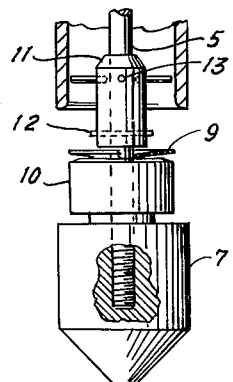
FIG. 2 is a fragmentary sectional elevational view, on an enlarged scale, showing the valve disc in its open position.
Figure 3:
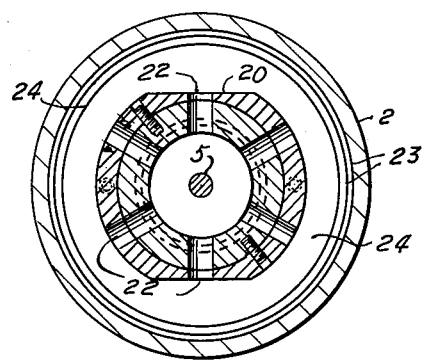
FIG. 3 is a sectional plan view taken on the lines 3—3 of FIG. 1.
Figure 4:
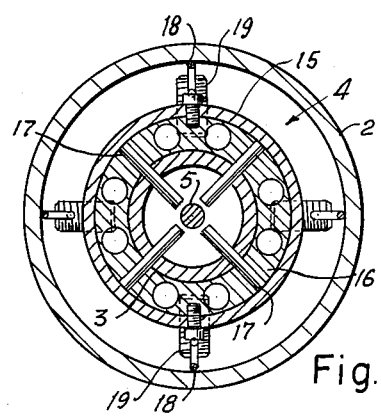
FIG. 4 is a sectional plan view taken on the lines 4—4 of FIG. 1.

Referring to the drawing, the numeral 1 designates a well bore, and the numeral 2 indicates a casing therein. The device of the invention includes a tubular element 3, which is open at its ends. The element 3 is adapted to be lowered in the casing 2, and has a support therefor, indicated generally by the numeral 4, which frictionally and yieldably engages the inner wall of the casing 2.

An elongated rod 5 is arranged concentrically within the element 3, and is adapted to be suspended from a wire line 6. The rod 5 is movable reciprocally relative to the element 3, and has a round weighted member 7 on its lower end for abutment against the lower end of the element 3, whereby the latter is supported on the rod 5, and a second weighted member 8 on its upper end for abutment against the upper end of the element 3 to urge the same downwardly relative to the casing 2.

A valve disc 9, which advantageously may be formed of resilient material, is positioned on the rod 5 above the member 7 for sliding engagement with the inner wall of the element 3 adjacent its lower end, to provide a closure therefor, when the rod 5 is in an elevated position below its uppermost position relative to the element 3.

The weighted member 7 comprises a separate piece which is threaded on the lower end of the rod 5.

The valve disc 9 is supported on an annular member 10 which encircles the rod 5 and is positioned above the member 7.

An annular guide member 11, which is positioned above the valve disc 9, surrounds the rod 5 and is secured thereto by a transverse pin 12. A plurality of circumferentially spaced guide pins 13 extend radially outwardly from the guide member 11 for engagement with the inner wall of the element 3 whereby the rod 5 is centered relative thereto.

The upper weighted member 8 comprises a separate piece having a central bore through which the rod 5 is passed, and is secured thereto by a set screw 14.

The support 4 includes a relatively short cylindrical member 15 which surrounds the element 3 intermediate its ends and is secured in spaced relation thereto by a spider 16. A plurality of circumferentially spaced pins 17, which are connected at one end to the inner wall of the cylindrical member 15, extend radially inwardly therefrom through aligned openings provided therefor in the spider 16 and the element 3. The pins 17 connect the cylindrical member 15 and the spider 16 to the element 3, and also serve as guides whereby the rod 5 is centered relative to the latter.

A plurality of resilient members 18, each of which comprises a piece of spring wire which is bowed intermediate its ends, are arranged longitudinally and spaced circumferentially relative to the cylindrical member 15. The members 18 are adjustably and detachably connected at their ends, by set screws 19, to the peripheral surface of the cylindrical member 15, and intermediate portions thereof frictionally and yieldably engage the inner wall of the casing 2.

The uppermost set screw 19 of each pair has a central opening in its outer end adapted to receive the adjacent end of one of the members 18, while the lowermost set screw 19 of the pair has a transverse slot in its outer end adapted to receive the adjacent end of the member 18. The set screws 19 are received in threaded openings provided therefor in the cylindrical member 15.

An annular fitting 20 is connected by threads to the upper end of the element 3. The fitting 20 has a restricted top opening 21 which serves as a guide for centering the rod 5 relative to the element 3. A plurality of circumferentially spaced fluid passages 22 are formed in the peripheral wall of the fitting 20.

A pair of resilient sealing rings 23 surround the fitting 20, below the fluid passages 22, and extend radially outwardly therefrom for sealing engagement with the inner wall of the casing 2. The sealing rings 23 are sandwiched between a plurality of washers 24, which in turn are secured between a downwardly facing external shoulder formed on the fitting 20 and a pair of set screws 25 which are received in threaded openings provided therefor in the peripheral surface of the fitting 20 below the washers 24.

The invention may be modified in various ways without departing from the spirt and scope thereof.

What is claimed is:

1. A tool for detecting leaks in oil well casing, comprising a tubular element adapted to be lowered in the casing, and a support therefor frictionally and yieldably engaging the inner wall of the casing, an elongated rod arranged concentrically within the tubular element and adapted to be suspended from a wire line, the rod being movable reciprocally relative to the tubular element and having a first weighted member on its lower end for abutment against the lower end of the tubular element, whereby the latter is supported on the rod when lowered into said casing, and a second weighted member on its upper end for abutment against the upper end of the tubular element to urge the same downwardly relative to the casing, and a disc valve on the rod above the first weighted member for sliding engagement with the inner wall of the tubular element adjacent its lower end providing a closure therefor when the rod and valve are in a position intermediate the upper and lowermost relative to the tubular element, whereby the weight of the rod and the fluid within the tubular element may be sensed.

2. In a tool for detecting leaks in oil well casing, comprising a tubular element adapted to be lowered in the casing, yieldable means on said tubular element adapted to frictionally engage the inner wall of the casing and support the element therein, a rod concentrically arranged within the tubular element and capable of suspension from a wire line, and reciprocable longitudinally of said tubular element, a weighted member on the lower end of said rod engageable with the lower end of said tubular element to support the same when lowered into said casing on said rod, a second weighted member on the upper end of said rod engageable with the upper end of the tubular element to urge the latter downwardly in the casing, a disc valve on the rod above the first weighted member engaging the inner wall of said tubular element and closing the same when the rod is lowered to a position intermediate its upper and lowermost position relative to the tubular element, and in which position the weight of the rod and the fluid within the tubular element may be sensed.

References Cited in the file of this patent

UNITED STATES PATENTS

| | | |
|---|---|---|
| 1,652,472 | Erwin et al. | Dec. 13, 1927 |
| 2,564,198 | Elkins | Aug. 14, 1951 |
| 2,627,317 | Baker | Feb. 3, 1953 |